United States Patent
Shimizu et al.

(10) Patent No.: US 8,270,850 B2
(45) Date of Patent: Sep. 18, 2012

(54) DEMODULATOR AND RECEIVING DEVICE

(75) Inventors: Takashi Shimizu, Kawasaki (JP); Koji Terada, Kawasaki (JP); Kiyomi Narita, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/621,949

(22) Filed: Nov. 19, 2009

(65) Prior Publication Data

US 2010/0129089 A1    May 27, 2010

(30) Foreign Application Priority Data

Nov. 21, 2008 (JP) ................. 2008-298576

(51) Int. Cl.
*H04B 10/06* (2006.01)

(52) U.S. Cl. ........ 398/212; 398/202; 398/213; 398/208; 398/209; 398/183; 398/188; 398/152; 398/65; 398/205; 398/206; 398/207; 398/158; 398/159; 359/325; 359/237; 385/1; 385/11; 385/14

(58) Field of Classification Search .................. 398/202, 398/203, 204, 205, 206, 207, 208, 209, 210, 398/212, 213, 214, 183, 188, 158, 159, 152, 398/65, 161, 147, 81, 33, 184, 185; 359/289, 325, 279, 237, 276; 385/1, 11, 14

See application file for complete search history.

(56) References Cited

U.S. PATENT DOCUMENTS

| | | | |
|---|---|---|---|
| 2005/0047780 A1 | 3/2005 | Hoshida et al. | |
| 2007/0081826 A1* | 4/2007 | Liu | 398/188 |
| 2007/0274732 A1 | 11/2007 | D'Errico et al. | |
| 2010/0135677 A1* | 6/2010 | Zaibel et al. | 398/208 |

FOREIGN PATENT DOCUMENTS

| | | |
|---|---|---|
| JP | 2005-080304 A | 3/2005 |
| JP | 2007-528173 A | 10/2007 |

\* cited by examiner

*Primary Examiner* — Hanh Phan
(74) *Attorney, Agent, or Firm* — Fujitsu Patent Center

(57) ABSTRACT

A demodulator includes: a splitter that branches a differential phase shift keying optical signal into a first branched optical signal passing through a first optical path and a second branched optical signal passing through a second optical path; a multiplexer that multiplexes the first branched optical signal having passed through the first optical path and the second branched optical signal having passed through the second optical path and makes interference between the first branched optical signal and the second branched optical signal; and a double refraction medium that reduces difference between phase differences between each polarized wave between the first branched optical signal and the second branched optical signal multiplexed by the multiplexer.

10 Claims, 7 Drawing Sheets

US 8,270,850 B2

DEMODULATOR AND RECEIVING DEVICE

CROSS-REFERENCE TO RELATED APPLICATION

This application is based upon and claims the benefit of priority of the prior Japanese Patent Application No. 2008-298576, filed on Nov. 21, 2008, the entire contents of which are incorporated herein by reference.

FIELD

A certain aspect of embodiments relates to a demodulator and a receiving device having the demodulator.

BACKGROUND

In an optical fiber communication adopting WDM (Wavelength Division Multiplexing), a demodulator including a delay interferometer demodulates an optical signal modulated by differential phase shift keying. In this case, a device for adjusting a phase is needed because phase difference is changed according to a wavelength of a received signal. For example, there is known a technology in which a phase is adjusted by heating a medium on an optical path and adjusting refraction index of the medium.

On the other hand, a polarized wave in a transmission path of an optical communication fluctuates at random. Therefore, it is preferable that a receiving device keeps property with respect to each polarized wave, in order to restrain reduction of extinction ratio. However, the property may be degraded when appropriate phase shift amount of a demodulator is different with respect to each polarized wave. Japanese Patent Application Publication No. 2005-80304 discloses a technology using a delay interferometer with use of a particular beam splitter of which phase shift amount of each polarized wave is small.

SUMMARY

According to an aspect of the present invention, there is provided a demodulator including: a splitter that branches a differential phase shift keying optical signal into a first branched optical signal passing through a first optical path and a second branched optical signal passing through a second optical path; a multiplexer that multiplexes the first branched optical signal having passed through the first optical path and the second branched optical signal having passed through the second optical path and makes interference between the first branched optical signal and the second branched optical signal; and a double refraction medium that reduces difference between phase differences between each polarized wave between the first branched optical signal and the second branched optical signal multiplexed by the multiplexer.

According to an aspect of the present invention, there is provided a receiving device including: a demodulator comprising a splitter that branches differential phase shift keying optical signal into a first branched optical signal passing through a first optical path and a second branched optical signal passing through a second optical path, a multiplexer that multiplexes the first branched optical signal having passed through the first optical path and the second branched optical signal having passed through the second optical path and makes interference between the first branched optical signal and the second branched optical signal, and a double refraction medium that reduces difference between phase differences between each polarized wave between the first branched optical signal and the second branched optical signal multiplexed by the multiplexer; and a receiving element that receives an optical signal multiplexed by the multiplexer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1:
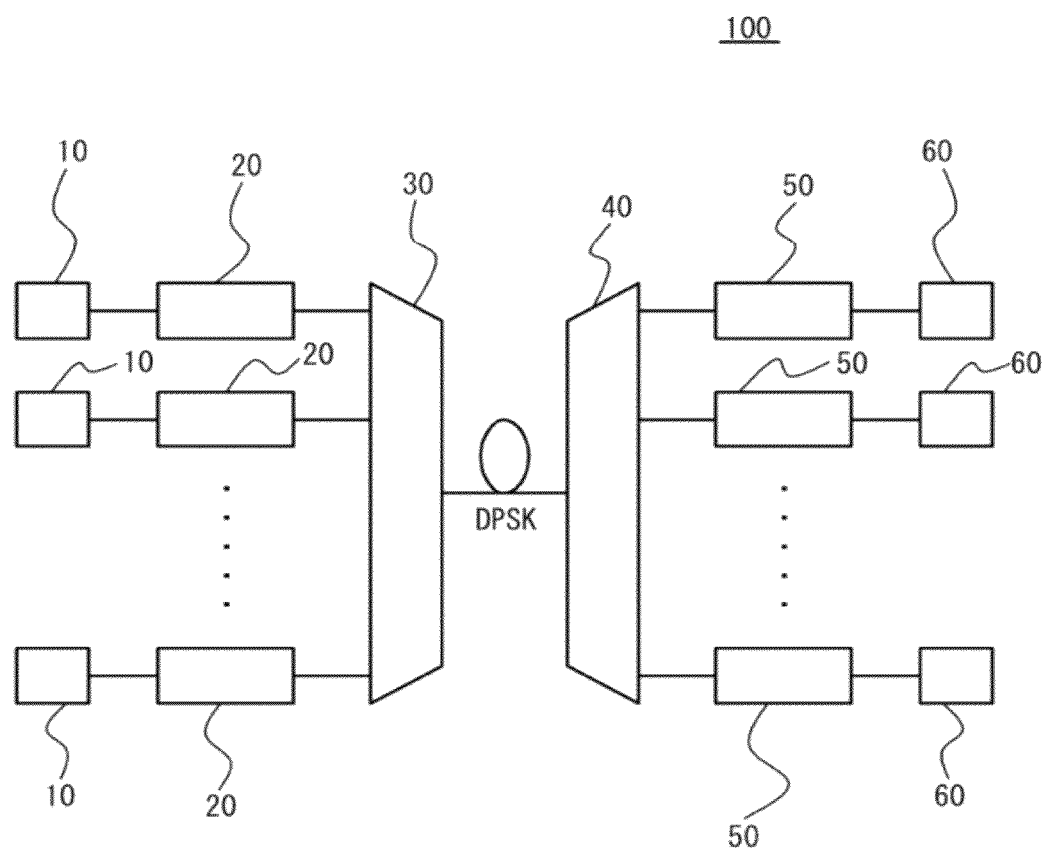
FIG. 1 illustrates a block diagram of a differential phase shift keying optical transmission system including a demodulator in accordance with a first embodiment.

FIG. 1 illustrates a block diagram of a DPSK (Differential Phase Shift Keying) optical transmission system 100 including a demodulator 50 in accordance with a first embodiment. As illustrated in FIG. 1, the optical transmission system 100 includes plural optical sources 10, plural phase modulators 20, a wavelength multiplexer 30, a wavelength demultiplexer 40, plural demodulators 50, and plural receiving devices 60.

Each of the optical sources 10 outputs an optical signal having a wavelength different from each other. The phase modulator 20 receives the optical signal from the optical source 10. The phase modulator 20 generates a phase modulation signal from the optical signal received from the optical source 10. The phase modulation signal generated by the phase modulator 20 is fed into the wavelength multiplexer 30. The wavelength multiplexer 30 multiplexes the plural phase modulation signals fed into the wavelength multiplexer 30. The multiplexed phase modulation signal is fed into the wavelength demultiplexer 40 via an optical transmission path or the like. The wavelength demultiplexer 40 demultiplexes the phase modulation signal fed in the wavelength demultiplexer 40 by wavelength. Each of the demultiplexed phase modulation signals is fed into each of the demodulators 50.

The demodulator 50 demodulates the demultiplexed phase modulation signal. In this case, the demodulator 50 demodulates the phase modulation signal with use of optical interference between the phase modulation signal and a signal delayed by a single period of modulation rate (a single symbol) of the phase modulation signal. The receiving device 60 receives the signal multiplexed by each demodulator 50. With the processes, an optical signal is DPSK transmitted.

Figure 2:
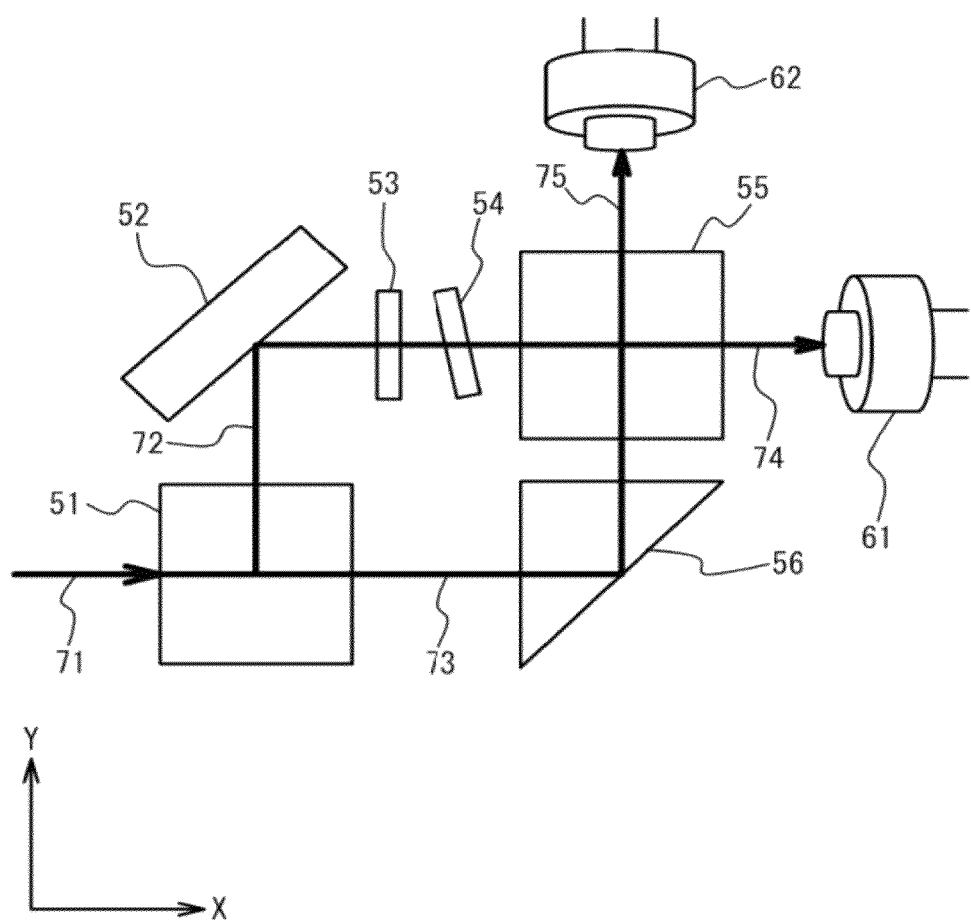
FIG. 2 illustrates a block diagram of details of the demodulator in accordance with the first embodiment.

FIG. 2 illustrates a block diagram of details of the demodulator 50. The demodulator 50 is a Mach-Zehnder type demodulator. As illustrated in FIG. 2, the demodulator 50 includes a power splitter 51, a mirror 52, a phase adjusting medium 53, a double refraction medium 54, a power splitter 55 and a prism mirror 56. In FIG. 2, a phase modulation signal 71 is fed into in X-axis direction.

The power splitter 51 receives the phase modulation signal 71 fed into the demodulator 50. The power splitter 51 acts as a splitter and branches the phase modulation signal 71 into a first branched optical signal 72 passing thorough a first optical path and a second branched optical signal 73 passing thorough a second optical path. In FIG. 2, the power splitter 51 branches the phase modulation signal 71 into the first branched optical signal 72 in Y-axis direction and the second branched optical signal 73 in the X-axis direction. The mirror 52 reflects the first branched optical signal 72 toward the X-axis direction. The first branched optical signal 72 reflected by the mirror 52 passes through the phase adjusting medium 53 and the double refraction medium 54, and is fed into the power splitter 55 in the X-axis direction.

The prism mirror 56 reflects the second branched optical signal 73 toward the Y-axis direction. In this case, the second branched optical signal 73 passes through a prism of the prism mirror 56 and is reflected by a mirror of the prism mirror 56. The second branched optical signal 73 reflected by the prism mirror 56 is fed into the power splitter 55 in the Y-axis direction. In the embodiment, the prism mirror 56 has refraction index and thickness so that a delay amount between the first branched optical signal 72 and the second branched optical signal 73 fed into the power splitter 55 is a single symbol.

The phase adjusting medium 53 adjusts phase difference between the first branched optical signal 72 and the second branched optical signal 73. For example, the phase adjusting medium 53 is made of a material of which refraction index is adjusted to be a desired one with temperature adjusting of the demodulator 50. The double refraction medium 54 has different refractive index with respect to each polarized wave.

In the demodulator 50 in accordance with the first embodiment, the first optical path is a path from the power splitter 51 to the power splitter 55 via the mirror 52, the phase adjusting medium 53 and the double refraction medium 54. The second optical path is a path from the power splitter 51 to the power splitter 55 via the prism mirror 56.

The power splitter 55 acts as a multiplexer. In the power splitter 55, the first branched optical signal 72 is output toward the X-axis direction as a demodulation signal 74 after multiplexed with the second branched optical signal 73. The second branched optical signal 73 is output toward the Y-axis direction as a demodulation signal 75 after multiplexed with the first branched optical signal 72. A photodiode 61 of the receiving device 60 receives the demodulation signal 74 as a normal phase output. A photodiode 62 of the receiving device 60 receives the demodulation signal 75 as a reverse phase output.

The phase of a polarized wave of the phase modulation signal 71 fed into the demodulator 50 fluctuates because of an optical component included in the demodulator 50. For example, electrical field of S wave and P wave of the first branched optical signal 72 is expressed by following Expression (1) and Expression (2). Electrical field of S wave and P wave of the second branched optical signal 73 is expressed by following Expression (3) and Expression (4).

$$E(t)=A\exp(-jwt+kz+\phi_s) \quad \text{(Expression 1)}$$

$$E(t)=A\exp(-jwt+kz+\phi_p) \quad \text{(Expression 2)}$$

$$E(t)=B\exp(-jwt+kz'+\theta_s) \quad \text{(Expression 3)}$$

$$E(t)=B\exp(-jwt+kz'+\theta_p) \quad \text{(Expression 4)}$$

E(t): electrical field after "t" seconds
A, B: amplitude
j: imaginary unit
w: frequency
k: wave number ($2\pi/\lambda$)
z: distance of the first optical path
z': distance of the second optical path Phase difference between the S wave of the first branched optical signal 72 and the S wave of the second branched optical signal 73 is ($\phi_s-\theta_s$). Phase difference between the P wave of the first branched optical signal 72 and the P wave of the second branched optical signal 73 is ($\phi_p-\theta_p$). Extinction ratio may be degraded when phase fluctuation amount $\phi_{error}=(\phi_s-\theta_s)-(\phi_p-\theta_p)$ is large. And so, in the first embodiment, the double refraction medium 54 has double refraction index reducing difference (the phase fluctuation amount $\phi_{error}$) between the phase differences between each polarized wave (the S wave and the P wave) between the first branched optical signal 72 and the second branched optical signal 73 multiplexed at the power splitter 55.

In the first embodiment, a sapphire board or the like may be used as the double refraction medium 54. Double refraction is generated in the sapphire board if crystal c-axis of the sapphire board is not parallel with light-incoming direction. For example, the sapphire board has refraction index of 1.768 with respect to ordinary light, and has refraction index of 1.76 to 1.768 with respect to extraordinary light. The refraction index with respect to the P wave and the refraction index with respect to the S wave may be adjusted by adjusting the direction of the crystal axis, the thickness and the angle with respect to the light-incoming angle of the sapphire board.

The phase fluctuation amount $\phi_{error}$ generated in the demodulator 50 is determined based on an optical component included in the demodulator 50. Therefore, the phase fluctuation amount $\phi_{error}$ generated in the demodulator 50 is determined if the optical component included in the demodulator 50 is determined. The phase fluctuation amount $\phi_{error}$ of the demodulator 50 may be easily measured. The phase fluctuation amount $\phi_{error}$ of the demodulator 50 may be corrected by selecting appropriate double refraction medium 54 based on the measured result.

Figure 3A:
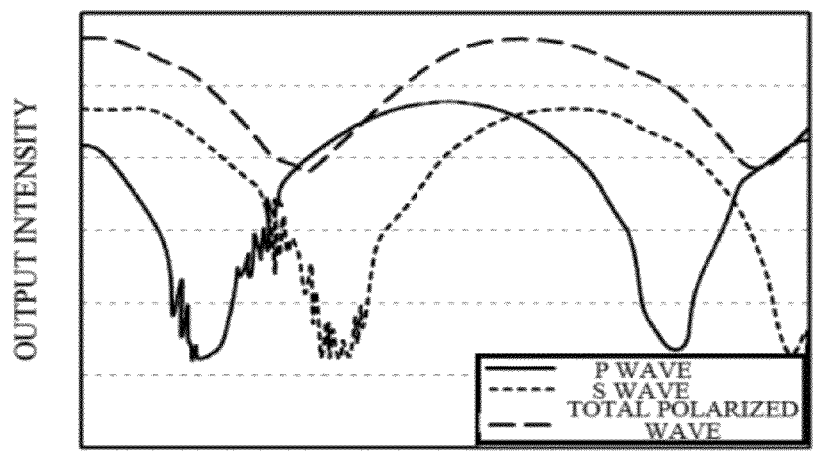
FIG. 3A through FIG. 3C illustrate an effect of a case using a double refraction medium.
Figure 3B:
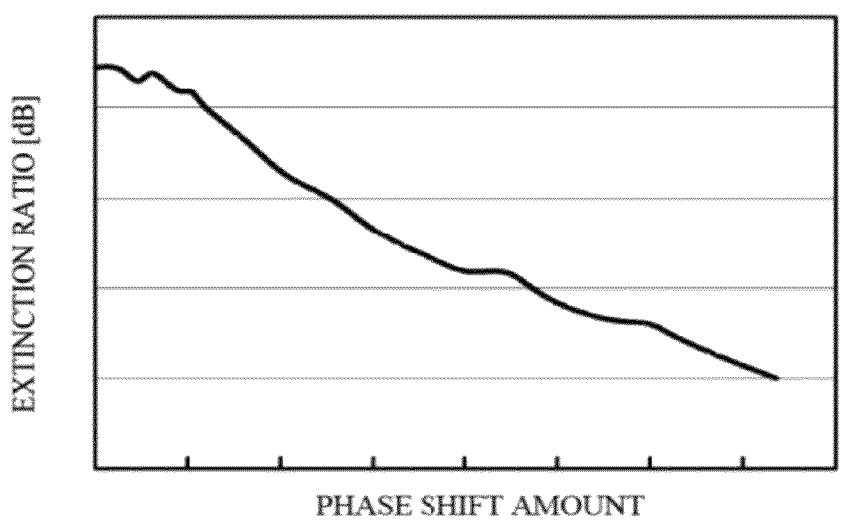
Figure 3C:
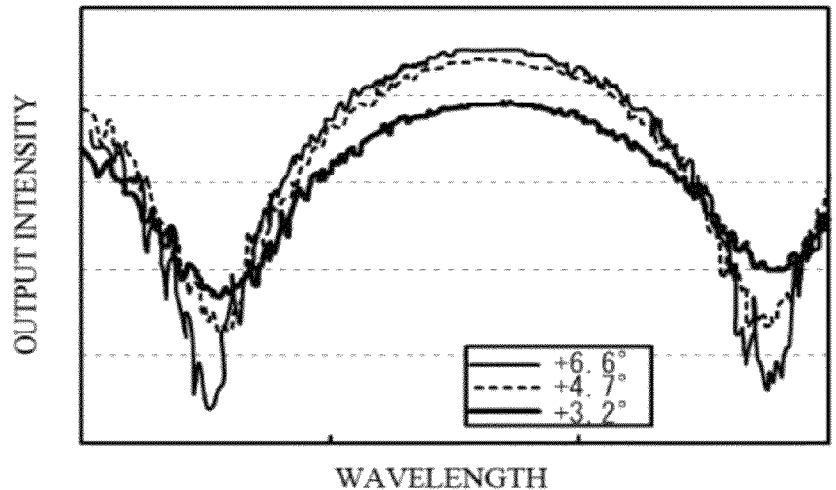

FIG. 3A through FIG. 3C illustrate an effect of a case using the double refraction medium 54. FIG. 3A illustrates an output intensity of the multiplexed P wave and S wave in a case where the double refraction medium 54 is not used. In FIG. 3A, the phase fluctuation amount $\phi_{error}$ is 90 degrees between the P wave and the S wave.

As illustrated in FIG. 3A, a peak of the S wave is different from that of the P wave when the phase fluctuation amount is generated between the P wave and the S wave. Therefore, the extinction ratio of total polarized wave, in which the S wave and the P wave are mixed, is reduced. In FIG. 3A, the extinction ratio is a difference between a maximum value and a minimum value of the output intensity.

FIG. 3B illustrates a relation between the phase fluctuation amount $\phi_{error}$ and the extinction ratio. As illustrated in FIG. 3B, the extinction ratio is degraded as the phase fluctuation amount $\phi_{error}$ is increased. Therefore, it is preferable that the phase fluctuation amount $\phi_{error}$ is minimized in order to obtain large extinction ratio.

FIG. 3C illustrates the extinction ration of a case using the double refraction medium 54. As illustrated in FIG. 3C, the degradation of the extinction ratio is restrained if the double refraction medium 54 is used. This is because the phase fluctuation amount $\phi_{error}$ is restrained when the double refraction medium 54 is used. Further, appropriate extinction ratio is obtained when the angle of the double refraction medium 54 with respect to the light-incoming angle is adjusted.

First Variant Embodiment

Figure 4:
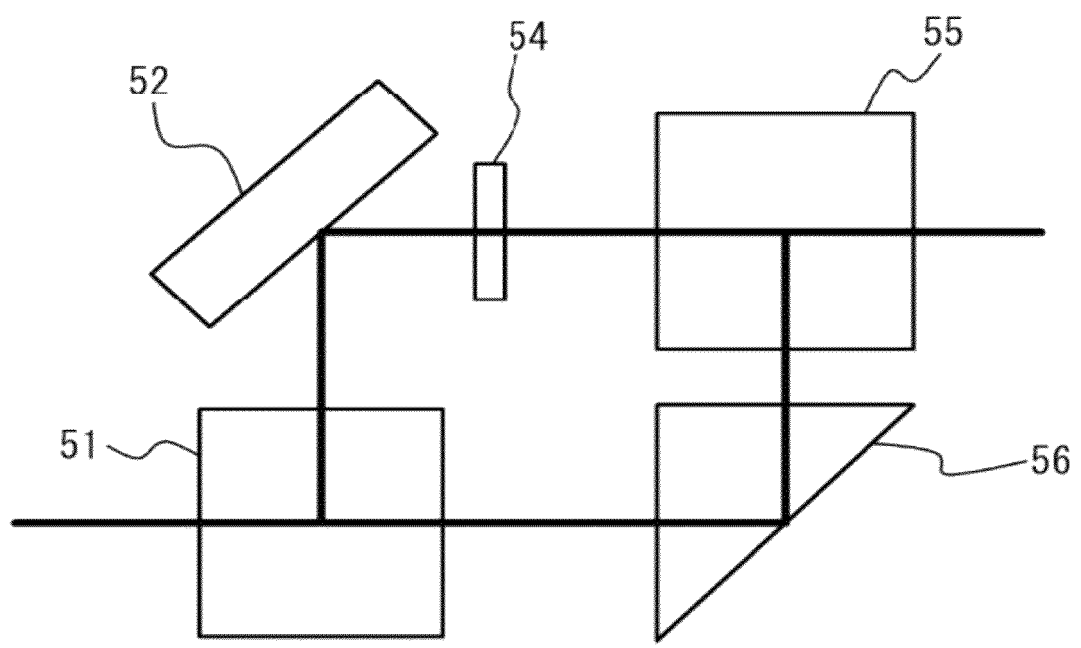
FIG. 4 illustrates a schematic block diagram of the demodulator in a case where crystal c-axis of the double refraction medium is inclined with respect to an incoming light.

FIG. 4 illustrates a schematic block diagram of the demodulator 50 in a case where the crystal c-axis of the double refraction medium 54 is inclined with respect to an incoming light. As illustrated in FIG. 4, the phase fluctuation amount $\phi_{error}$ may be corrected by not inclining the double refraction medium 54 but inclining the crystal axis.

Second Variant Embodiment

Figure 5:
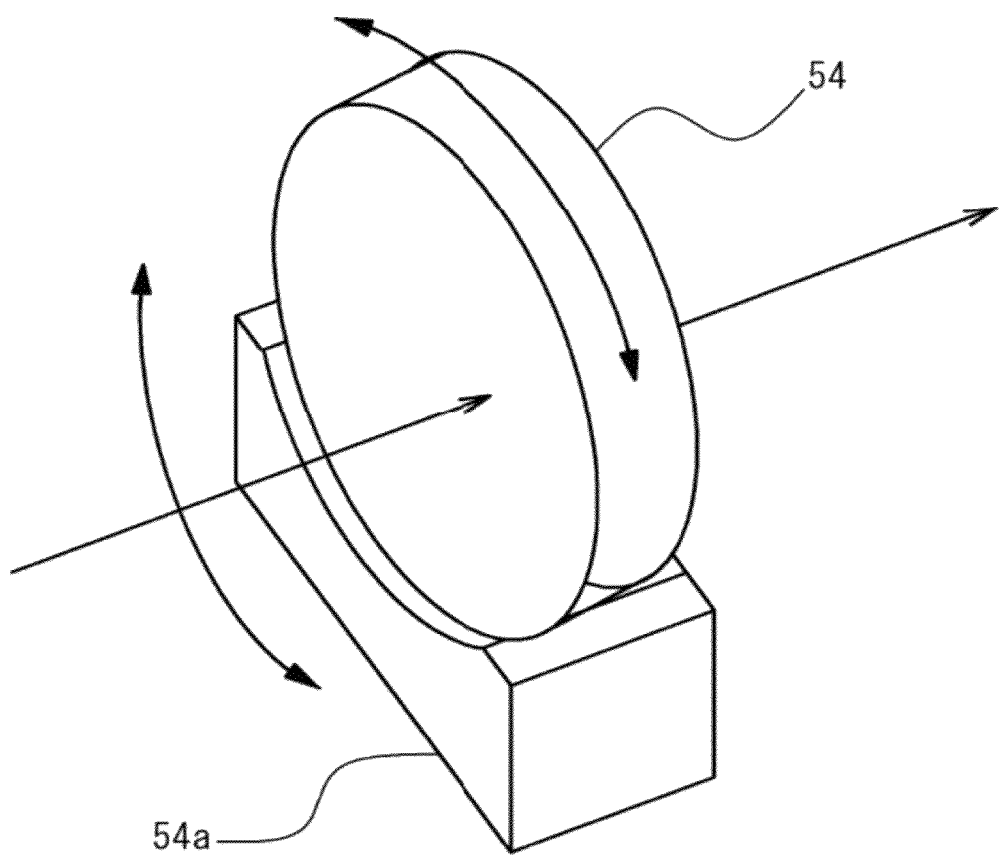
FIG. 5 illustrates a perspective view of a double-refraction-index adjuster that rotates the double refraction medium around the incoming light.

FIG. 5 illustrates a perspective view of a double-refraction-index adjuster that rotates the double refraction medium 54 around an incoming light. As illustrated in FIG. 5, a supporter 54a supports the double refraction medium 54 so that the double refraction medium 54 is capable of rotating. In this case, the double refraction index of the double refraction medium 54 may be adjusted by rotating the double refraction medium 54.

The double refraction medium 54 may be arranged on any of the first optical path and the second optical path. In any case, the reduction of the extinction ratio is retrained if the double refraction medium 54 has the double refraction index reducing the phase fluctuation amount $\phi_{error}$.

[b] Second Embodiment

Figure 6:
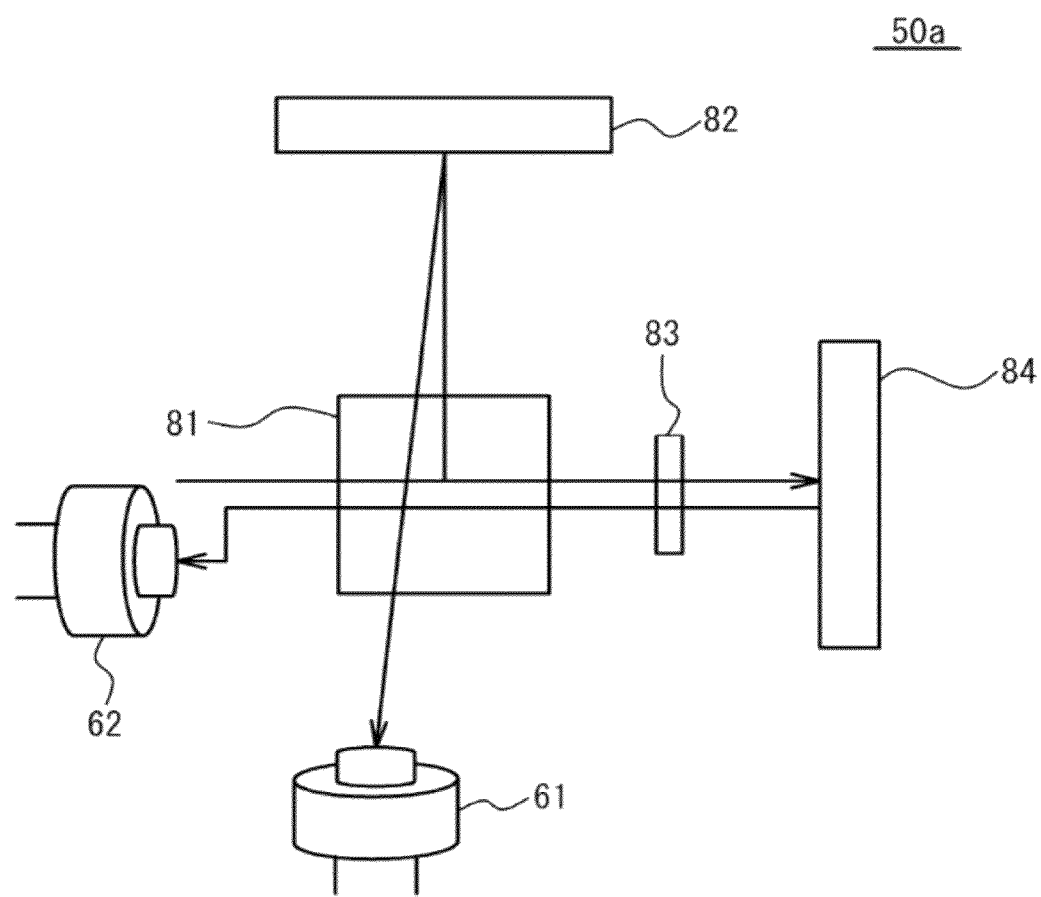
FIG. 6 illustrates a block diagram of a demodulator in accordance with a second embodiment.

FIG. 6 illustrates a block diagram of a demodulator 50a in accordance with a second embodiment. The demodulator 50a is of Michelson type. As illustrated in FIG. 6, the demodulator 50a includes a half mirror 81, a mirror 82, a double refraction medium 83, and a mirror 84.

The half mirror 81 acts as a splitter that branches an incoming light. The half mirror 81 branches the incoming light into a first branched optical signal passing thorough a first optical path and a second branched optical signal passing thorough a second optical path. The first branched optical signal is reflected by the mirror 82 and is fed into the half mirror 81 again. Therefore, the first optical path is a path traveling back and forth between the half mirror 81 and the mirror 82.

The second branched light passes through the double refraction medium 83, is reflected by the mirror 84, passes through the double refraction medium 83 again, and is fed into the half mirror 81. Therefore, the second optical path is a path traveling back and forth between the half mirror 81 and the mirror 84.

The half mirror 81 acts as a multiplexer. The first branched optical signal fed into the half mirror 81 via the first optical path is output after multiplexed with the second optical signal having passed through the second optical path, and is received by the photodiode 61 of the receiving device 60. The second branched optical signal fed into the half mirror 81 via the second optical path is output after multiplexed with the first branched optical signal having passed through the first optical path, and is received by the photodiode 62 of the receiving device 60.

In the embodiment, the double refraction medium 83 has double refraction index reducing difference (the phase fluctuation amount $\phi_{error}$) between the phase differences between each polarized wave between the first branched optical signal and the second branched optical signal multiplexed at the half mirror 81. Therefore, the reduction of the extinction ratio is restrained.

[c] Third Embodiment

Figure 7:
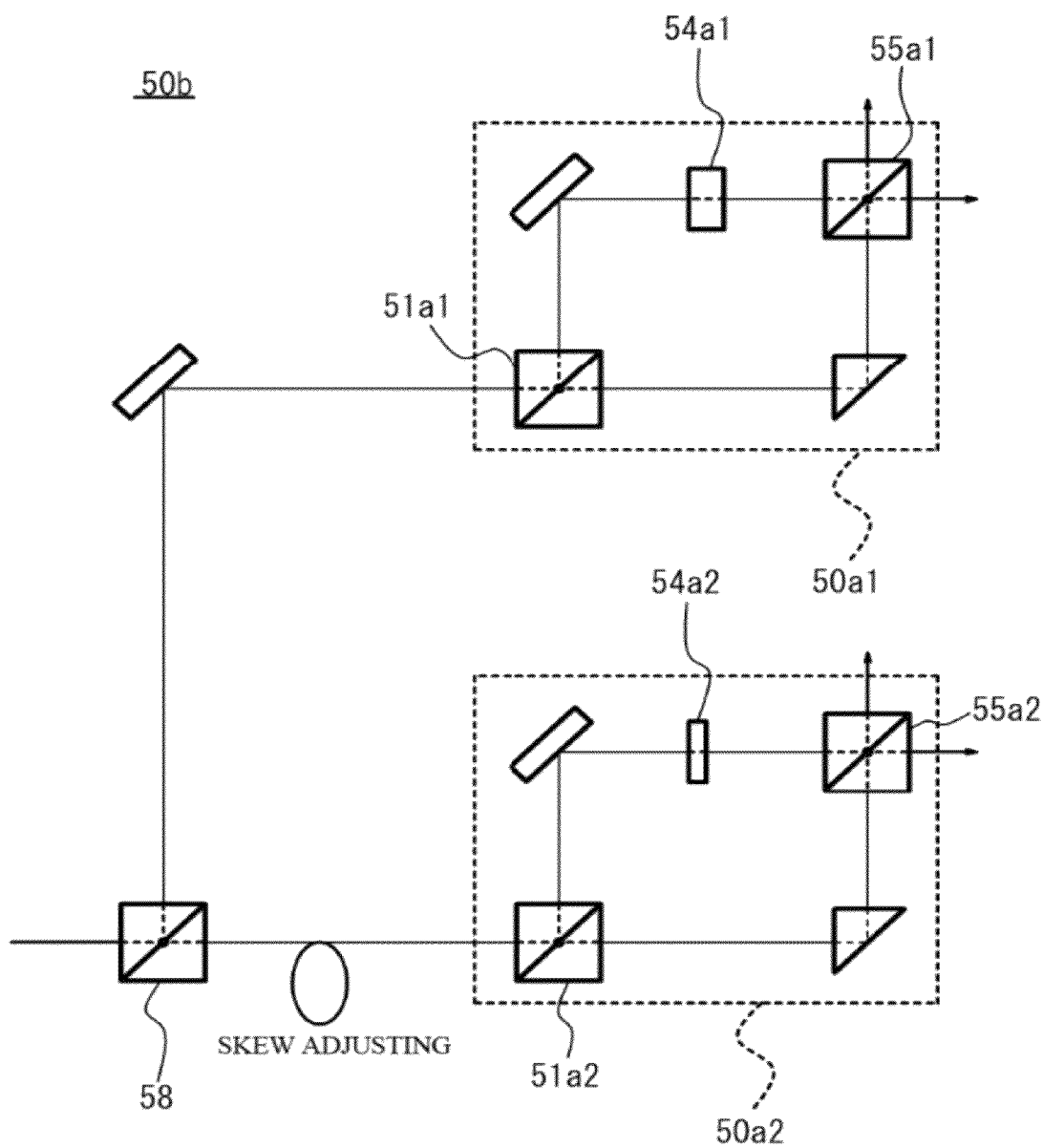
FIG. 7 illustrates a block diagram of a demodulator in accordance with a third embodiment.

FIG. 7 illustrates a block diagram of a demodulator 50b in accordance with a third embodiment. As illustrated in FIG. 7, the demodulator 50b has two demodulators of the first embodiment or the second embodiment (a demodulator 50a1 and a demodulator 50a2). For example, two optical signals branched by a power splitter 58 are fed into each demodulator.

Skew is adjusted so that relative phase difference is zero degree at optical frequency of an optical signal fed into the demodulator 50a1 and the demodulator 50a2 (for example, approximately 200 THz).

A double refraction medium 54a1 of the demodulator 50a1 is arranged on a first optical path branching at a power splitter 51a1. The double refraction medium 54a1 has double refraction index reducing difference (the phase fluctuation amount $\phi_{error}$) between the phase differences between each polarized wave between the first branched optical signal and the second branched optical signal multiplexed at a power splitter 55a1.

A double refraction medium 54a2 of the demodulator 50a2 is arranged on a first optical path branching at a power splitter 51a2. The double refraction medium 54a2 has double refraction index reducing difference (the phase fluctuation amount $\phi_{error}$) between the phase differences between each polarized wave between the first branched optical signal and the second branched optical signal multiplexed at a power splitter 55a2.

The demodulator 50b in accordance with the third embodiment demodulates DQPSK (Differential Quadrature Phase Shift Keying) signals. The demodulator of the first embodiment or the second embodiment may be used as a demodulator of the DQPSK signal.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. A demodulator comprising:
  a splitter that branches a differential phase shift keying optical signal into a first branched optical signal passing through a first optical path and a second branched optical signal passing through a second optical path;
  a multiplexer that multiplexes the first branched optical signal having passed through the first optical path and the second branched optical signal having passed through the second optical path and makes interference between the first branched optical signal and the second branched optical signal; and
  a double refraction medium that reduces difference between phase differences between each polarized wave between the first branched optical signal and the second branched optical signal multiplexed by the multiplexer.

2. The demodulator as claimed in claim 1, further comprising a double-refraction-index adjuster that adjusts double refraction index of the double refraction medium.

3. The demodulator as claimed in claim 1, wherein a light incoming face of the double refraction medium is inclined with respect to an incoming light.

4. The demodulator as claimed in claim 1, wherein the double refraction medium is arranged so that a crystal c-axis of the double refraction medium is inclined with respect to an incoming light.

5. The demodulator as claimed in claim 1, wherein the double refraction medium is a sapphire.

6. A receiving device comprising:
  a demodulator comprising a splitter that branches a differential phase shift keying optical signal into a first branched optical signal passing through a first optical path and a second branched optical signal passing through a second optical path, a multiplexer that multiplexes the first branched optical signal having passed through the first optical path and the second branched optical signal having passed through the second optical path and makes interference between the first branched optical signal and the second branched optical signal, and a double refraction medium that reduces difference between phase differences between each polarized wave between the first branched optical signal and the second branched optical signal multiplexed by the multiplexer; and
  a receiving element that receives an optical signal multiplexed by the multiplexer.

7. The receiving device as claimed in claim 6, wherein the demodulator comprises a double-refraction-index adjuster that adjusts double refraction index of the double refraction medium.

8. The receiving device as claimed in claim 6, wherein a light incoming face of the double refraction medium is inclined with respect to an incoming light.

9. The receiving device as claimed in claim 6, wherein the double refraction medium is arranged so that a crystal c-axis of the double refraction medium is inclined with respect to an incoming light.

10. The receiving device as claimed in claim 6, wherein the double refraction medium is a sapphire.

\* \* \* \* \*